United States Patent

Lingl

[11] Patent Number: 6,102,650
[45] Date of Patent: Aug. 15, 2000

[54] APPARATUS FOR SHIFTING ROWS OF TILES INTO A SKEW POSITION

[75] Inventor: Hans Lingl, Neu-Ulm, Germany

[73] Assignee: Hans Lingl Anlagenbau und Verfahrenstechnik GmbH & Co. KG, Neu-Ulm, Germany

[21] Appl. No.: 08/985,062

[22] Filed: Dec. 4, 1997

[30] Foreign Application Priority Data

Dec. 6, 1996 [DE] Germany .......................... 196 50 606

[51] Int. Cl.[7] .................................................. B65H 29/10
[52] U.S. Cl. ........................................ 414/788; 294/119.3
[58] Field of Search ........................ 414/788; 294/119.3

[56] References Cited

U.S. PATENT DOCUMENTS

| | | | |
|---|---|---|---|
| 3,161,431 | 12/1964 | Francis | 294/119.3 |
| 3,253,854 | 5/1966 | Hollander, Jr. | 294/119.3 |
| 3,981,528 | 9/1976 | Andorf et al. | 294/119.3 |
| 4,285,537 | 8/1981 | Hawrylo et al. | 294/119.3 |
| 4,400,872 | 8/1983 | Berges | 414/788 |
| 5,090,759 | 2/1992 | Sato et al. | 294/119.3 |
| 5,209,538 | 5/1993 | Gabruel | 294/119.3 |
| 5,306,469 | 4/1994 | Iles | 294/119.3 |

FOREIGN PATENT DOCUMENTS

| | | | |
|---|---|---|---|
| 1671588 | 8/1991 | U.S.S.R. | 414/788 |

OTHER PUBLICATIONS

Lingl Company, Split Tile Plant, West Germany, 1983.

*Primary Examiner*—Douglas Hess
*Attorney, Agent, or Firm*—Nixon & Vanderhye

[57] ABSTRACT

Apparatus for simultaneously shifting a plurality of tiles (2) or tile mouldings arranged in at least one row (1), into a skew position with respect to the tile row, comprising at least two gripper devices (3) which engage opposite end faces (5) of the tiles (2). At least one of the gripper devices (3) is movable in the longitudinal direction of the one tile row (1). The gripper devices (3) have an elastic pad (6) on the sides facing the tile end faces (5), in order to avoid any damage to the tile end face (5) or tile edges (8).

9 Claims, 1 Drawing Sheet

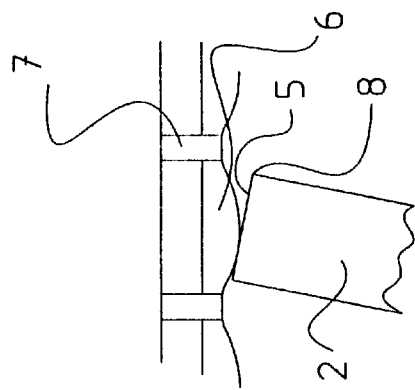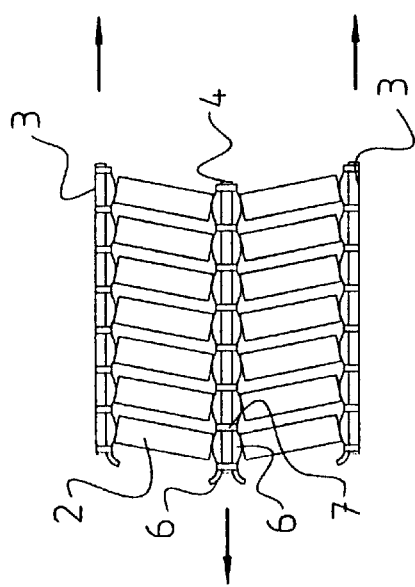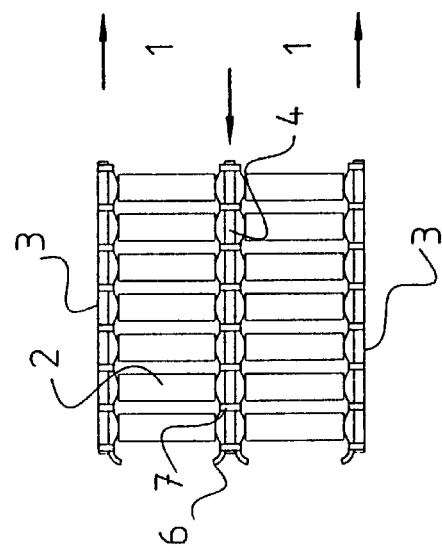
Fig 3
Fig 2
Fig 1
Fig 4

APPARATUS FOR SHIFTING ROWS OF TILES INTO A SKEW POSITION

The invention relates to a transfer gripper for simultaneously shifting a plurality of tiles or tile mouldings, arranged in at least one row, into a skew position with respect to the tile row.

Such skewing of tiles or tile mouldings arranged in spaced relationship in rows on a marshalling conveyor system while being transferred to a second position is intended to enable a plurality of layers of tiles to be stacked on one another in a criss-cross arrangement as shown diagrammatically in FIG. 4. The stacks of layers of tiles obtained as a result of this criss-cross arrangement in the second position are more stable.

It is known to shift a row of tiles into a skew position by means of opposite gripper devices which engage the tile end faces and at least one of which performs a movement in the longitudinal direction of the row of tiles. However, on the longitudinal movement of the gripper the tile end face or end edges may be damaged due to the tilting of the tiles with respect to the gripper. This problem occurs particularly with wet and still plastic tile mouldings.

It is therefore an object of this invention to solve the said problems and to provide an apparatus for skewing tiles, and particularly wet tile mouldings as well, while obviating any damage to the tiles.

The advantage of the apparatus according to the invention is that it is possible to skew one or more rows of tiles without damaging the tiles or the still wet tile mouldings. The apparatus also has the advantage that it is possible to arrange relatively large quantities of tiles in a criss-cross arrangement in a short time.

Preferably, the elastic pad is divided into individual elastic zones corresponding to the distance between the tiles, said elastic zones can have a rounded shape to allow a rolling movement of the tile end faces during the skewing movement.

The elastic pad is preferably constructed as an inflatable tube which is divided by clips to form elastic zones expanded in the form of cushions in the inflated state. This construction is simple and inexpensive to produce.

For the purpose of shifting two or more rows of tiles into a skew position at least one central support device disposed between each two rows of tiles is provided in addition to two outer gripper devices and, like the latter, also have an elastic pad at their sides facing the tile end faces. The outer gripper device and/or the central support device are movable in the longitudinal direction of the row of tiles for the purpose of performing the skewing movement.

One exemplified embodiment of the apparatus according to the invention is described below with reference to the drawings wherein:

FIG. 1 is a diagram showing one exemplified embodiment of the apparatus according to the invention in plan view in a first state of movement.

FIG. 2 is a diagram of the apparatus of FIG. 1 in a second state of movement.

FIG. 3 is a detail of the apparatus shown in FIG. 2 and

FIG. 4 is a diagram showing a criss-cross arrangement of superposed rows of tiles.

FIG. 1 shows tiles 2 disposed in spaced relationship to one another in two rows 1, the tiles being engaged by two gripper devices in the form of gripper strips 3, the rows of tiles 1 being pressed against an intermediate tongue 4 serving as a support leans. At the sides facing the end faces 5 of the tiles, both the gripper strips 3 and the intermediate tongue 4 have elastic pads 6. These elastic pads 6 can preferably be in the for of inflatable tubes so held by clips 7 in the spaces between the tiles 2 that the tubes 6 expand on inflation to form cushions between the clips and engage the end faces 5 of the tiles 2 during the gripping operation. As shown by the arrows, the gripper strips are then moved to the right and the intermediate tongue 4 to the left in order to bring the two rows of tiles 1 into a skew position. It is also possible for just the gripper strip 3 or just the central intermediate tongue 4 to be moved.

As will be seen from rig. 3, the zones 6 which expand to form cushions form an elastic pad which allows the tile end faces 5 to perform a rolling movement. This obviates any damage to the end faces 5 or to the tile edges 8.

What is claimed is:

1. Apparatus for simultaneously shifting a plurality of spaced tiles arranged in at least a first row thereof into a skew position with respect to the tile row, comprising at least two gripper devices for engaging opposite end faces of the tiles, at least one of the gripper devices being movable in the longitudinal direction of said tile row, each said gripper device having an elastic pad on sides thereof facing the tile end faces, said elastic pads being divided into individual elastic zones corresponding to the spacing between the tiles.

2. Apparatus according to claim 1 wherein each of said elastic zones has a rounded shape facing a tile end face enabling a rolling movement of the tile end faces along said elastic zones.

3. Apparatus for simultaneously shifting a plurality of spaced tiles arranged in at least a first row thereof into a skew position with respect to the tile row, comprising at least two gripper devices for engaging opposite end faces of the tiles, at least one of the gripper devices being movable in the longitudinal direction of said tile row, each said gripper device having an elastic pad on sides thereof facing the tile end faces, said elastic pad including an inflatable tube divided by clips into zones which zones are expanded to form cushions in response to inflation of said tube, said zones having a spacing corresponding to the spacing of the tiles from one another.

4. Apparatus for simultaneously shifting a plurality of spaced tiles arranged in at least a first row thereof into a skew position with respect to the tile row, in combination with the tiles, comprising at least two gripper devices for engaging opposite end faces of said tiles, at least one of the gripper devices being movable in the longitudinal direction of said tile row, each said gripper devices having an elastic pad on sides thereof facing the tile end faces.

5. Apparatus according to claim 4 wherein said tiles comprise molded tiles.

6. Apparatus for simultaneously shifting a plurality of spaced tiles arranged in two rows into a skew position with respect to each tile row, the tile rows lying in side-by-side relation to one another comprising:

two outer gripper devices for respectively engaging outside end faces of the tiles in the tile rows thereof;

a central support device disposed between said two rows of tiles for engaging inside end faces of the tiles in the respective tile rows thereof;

each of said two outer gripper devices having an elastic pad on sides thereof for engaging the outside tile end faces;

said central support device having elastic pads on opposite sides thereof for engaging inside end faces of the tiles in the respective tile rows thereof; and one of said central support device and said two outer gripper devices being movable in the longitudinal direction of the rows of tiles to skew the tiles in each row thereof.

7. Apparatus according to claim 6 wherein said central support device and said two outer gripper devices are movable in opposite directions to skew the tiles in each row thereof.

8. Apparatus according to claim 6 in combination with said tiles.

9. Apparatus according to claim 8 wherein said tiles comprise tile moldings.

\* \* \* \* \*